United States Patent [19]

Shin et al.

[11] Patent Number: 5,202,212

[45] Date of Patent: Apr. 13, 1993

[54] TONER COMPOSITION FOR ELECTROPHOTOGRAPHY

[75] Inventors: Masaaki Shin; Kazuo Hagiwara; Akira Misawa; Kazuo Hisamatsu; Keiichi Ishikawa, all of Kanagawa, Japan

[73] Assignee: Mitsui Toatsu Chemicals, Inc., Tokyo, Japan

[21] Appl. No.: 919,387

[22] Filed: Jul. 29, 1992

Related U.S. Application Data

[63] Continuation of Ser. No. 640,859, Jan. 14, 1991, abandoned.

[30] Foreign Application Priority Data

Jan. 16, 1990 [JP] Japan .................................. 2-4495

[51] Int. Cl.$^5$ ........................ G03G 9/087; C08F 20/00
[52] U.S. Cl. ................................. 430/109; 430/904; 525/440
[58] Field of Search ................ 430/109, 904; 525/440

[56] References Cited

U.S. PATENT DOCUMENTS 4,833,057  5/1989  Misawa .
5,037,715  8/1991  Hagiwara et al. ................ 430/109

FOREIGN PATENT DOCUMENTS 0256136  2/1988  European Pat. Off. .
0375321  6/1990  European Pat. Off. .
51-23354  7/1976  Japan .
55-6895   2/1980  Japan .
63-56659  3/1988  Japan .

Primary Examiner—Marion E. McCamish
Assistant Examiner—C. D. RoDee
Attorney, Agent, or Firm—Burns, Doane, Swecker & Mathis

[57] ABSTRACT

A toner composition for electrophotography comprises, as a principal component, a reaction product of a mixture which comprises 20 to 80% by weight of a polyester resin (A) whose number average molecular weight ranges from 1,000 to 5,000, whose glass transition point ranges from 0° to 50° C., whose OH value ranges from 20 to 60 KOHmg/g and which is prepared by using at least one trifunctional alcohol in an amount of from 2 to 10 mole % on the basis of the total amount of starting raw alcohols consisting of at least one diol and at least one trifunctional alcohol; and 80 to 20% by weight of a polyester resin (B) whose number average molecular weight ranges from 1,000 to 5,000, whose glass transition point ranges from 50° to 90° C. and whose OH value is not more than 5 KOH mg/g, with a diisocyanate. The toner composition has hot-melt properties suitable for rapid copying, for instance, the lower limit of fixing temperature thereof is low and the temperature range within which the toner can be fixed is very wide. Moreover, the toner composition is excellent in resistance to offset, antiblocking properties, resistance to ADF contamination, pulverization properties and quality of images. Thus, the toner composition shows practically excellent quality as a toner composition for electrophotography.

6 Claims, No Drawings

TONER COMPOSITION FOR ELECTROPHOTOGRAPHY

This application is a continuation of application Ser. No. 07/640,859, filed Jan. 14, 1991, now abandoned.

BACKGROUND OF THE INVENTION

The present invention relates to a toner composition for electrophotography and more specifically to a toner composition for electrophotography which mainly comprises a urethane-modified polyester resin.

As the office automation techniques have advanced, demand for copying apparatuses and laser printers to which the electrophotographic method is applied has rapidly been increased and correspondingly the development of such apparatuses having higher quality have also been required. In particular, there has been a large requirement for the development of such apparatuses which make it possible to perform a fixing process at a low temperature from the viewpoint speeding up of copying processes, Energy-Savings and high safety. In addition, there has been a requirement for the development of a toner having excellent fixing ability at a low temperature.

To improve the fixing ability of a toner, there is a general need to reduce the viscosity of the toner in its molten state to enlarge the contact area between the toner and a substrate for fixing the toner. For this reason, there has been used, for instance, a toner-bonding resin having a low glass transition point or a low molecular weight in conventional techniques. However, these methods suffer from a variety of drawbacks such as these detailed below.

The toners must stably maintain their powdery form during applications and/or storage and, in other words, must be excellent in antiblocking properties. However, resins having a low glass transition point are in general insufficient in antiblocking properties.

Moreover, if these toners are used in the heat roll-fixing method, the toner transferred to hot rolls is liable to contaminate the transfer paper subsequently fed to a copying apparatus because of the direct contact between the hot rolls and the molten toner (i.e., it is liable to cause so-called offset phenomenon). This tendency becomes in general conspicuous when the molecular weight of the resin used is low.

Recently, an auto document feeder (ADF) for rapid copying has been connected to copying apparatuses, but portions of the toners adhered to the copying paper peels off from the copying paper and contaminates the copying paper subsequently supplied to the apparatus (so-called ADF contamination) if the adhesion of the toner to the paper is insufficient and/or if the strength of the toner is low. Resistance to ADF contamination is very important when a great deal of double copy operations are performed at one time and thus there has been a large demand for the improvement in resistance to ADF contamination.

As means for solving such problems, there have been proposed a variety of techniques, for instance, a toner which comprises a vinyl polymer properly crosslinked through the use of a crosslinking agent and a molecular weight modifier (see Japanese Patent Publication for Opposition Purpose (hereinafter referred to as "J. P. KOKOKU") No. Sho 51-2334); a toner which comprises structural units derived from an $\alpha,\beta$-unsaturated ethylene monomer and whose molecular weight distribution is widened so that it has a ratio of the weight average molecular weight (Mw) to the number average molecular weight (Mn), Mw/Mn, ranging from 3.5 to 40 (see J. P. KOKOKU No. Sho 55-6805); and toners which comprise polymers blended so that the glass transition point, the molecular weight, the gel content or the like are properly controlled. Although the temperature range within which the toners can be fixed, in other words, the temperature range between the offset-generation temperature and the lower limit of fixing temperature, can be expanded or improved compared to that for conventional toners which comprise a single non-crosslinked resin having a relatively narrow molecular weight distribution, such a solution is still insufficient.

There has also been known a method for improving resistance to offset by partially crosslinking a polyester resin. In addition, the inventors of this invention have already proposed a method for improving resistance to offset which comprises blending a polyester resin having a low molecular weight and that having a high molecular weight in order to broaden the molecular weight distribution of the resulting polymer blend (see WO87/04811).

However, while the method which comprises partially crosslinking a polyester resin makes it possible to prevent the offset phenomenon at a high temperature to some extent, the lower limit of fixing temperature is simultaneously increased. Therefore, it becomes difficult to perform fixing at a low temperature and the method cannot fulfill the requirements of speeding up of the copying operation and of energy-saving. Moreover, the partial crosslinking of a polyester resin impairs the dispersibility of toner additives in the polyester resin and the wettability with respect to transfer paper peculiar to the polyester resin. Thus, in practice, the method hardly improves the resistance to offset.

In addition, it has been concluded that if the method disclosed in WO87/04811 is adopted, the molecular weight distribution Of the resulting polymer blend becomes narrower than the predetermined one and that the desired effect cannot be necessarily achieved.

SUMMARY OF THE INVENTION

Accordingly, an object of the present invention is to provide a toner composition for electrophotography which is excellent in either of low temperature fixing ability, resistance to offset, antiblocking properties and resistance to ADF contamination.

The inventors of this invention have conducted intensive studies to accomplish the foregoing object of the present invention, and have found out that a toner composition for electrophotography which is excellent in either of low temperature fixing ability, resistance to offset, antiblocking properties and resistance to ADF contamination can effectively be obtained if a reaction product of a mixture of two kinds of polyester resins, each having a number average molecular weight, a glass transition point and an OH value falling within specific ranges, respectively, with a diisocyanate is used as a principal component of the toner composition, and thus have completed the present invention.

The toner composition for electrophotography according to the present invention comprises, as a principal component, a reaction product of a mixture comprising 20 to 80% by weight of a polyester resin (A) whose number average molecular weight ranges from 1,000 to 5,000, whose glass transition point ranges from 0° to 50° C., whose OH value range from 20 to 60 KOHmg/g and which is prepared by using at least one trifunctional alcohol in an amount of from 2 to 10 mole % on the basis of the total amount of starting raw alcohols consisting of at least one diol and at least one trifunctional alcohol; and 80 to 20% by weight of a polyester resin (B) whose number average molecular weight ranges from 1,000 to 5,000, whose glass transition point ranges from 50 to 90° C. and whose OH value is not more than 5 KOHmg/g, with a diisocyanate.

PREFERRED EMBODIMENTS OF THE INVENTION

The toner composition according to the present invention will hereunder be described in more detail.

The polyester resin (A) herein means those obtained by polycondensation of at least one dicarboxylic acid, at least one diol and at least one trifunctional alcohol. Examples of the dicarboxylic acids are aliphatic dibasic acids such as malonic acid, succinic acid, glutaric acid, adipic acid, azelaic acid, sebacic acid and hexahydrophthalic anhydride; aliphatic unsaturated dibasic acids such as maleic acid, maleic anhydride, fumaric acid, itaconc acid and citraconic acid; and aromatic dibasic acids such as phthalic anhydride, phthalic acid, terephthalic acid and isophthalic acid; as well as lower alkyl esters thereof.

Examples of the diols used in the present invention include ethylene glycol, 1,2-propylene glycol, 1,3-propylene glycol, 1,3-butylene glycol, 1,4-butylene glycol, 1,6-hexanediol, neopentyl glycol, diethylene glycol, triethylene glycol, dipropylene glycol, hydrogenated bisphenol A, bisphenol A-ethylene oxide adduct and bisphenol A-propylene oxide adduct.

Examples of the trifunctional alcohols used in the present invention include glycerin, trimethylol propane and trimethylol ethane. The amount of the trifunctional alcohols is selected so that at least one trifunctional alcohol ranges from 2 to 10 mole % on the basis of the total amount of starting raw alcohols consisting of at least one diol and at least one trifunctional alcohol. This is because if the amount of the trifunctional alcohols used is less than 2 mole %, the molecular weight of the resulting polymer is low and thus the resistance to offset of the toner composition finally obtained cannot be improved sufficiently, while if it is more than 10 mole %, the gel content of the resulting resin becomes high and, as a result, the fixing ability of the toner composition finally obtained is impaired.

The molecular weight of the polyester resin (A) preferably ranges from 1,000 to 5,000 which is expressed in terms of the number average molecular weight. This is because if the number average molecular weight of the polyester resin (A) is less than 1,000, the glass transition point (Tg) of the polyester resin is too low and accordingly the resulting toner composition is liable to cause blocking, while if it is more than 5,000, the polyester resin (A) is easily converted into a reaction product having a higher molecular weight with a small amount of a diisocyanate, the content of the urethane component in the polymer is lowered and thus the resistance to ADF contamination of the final toner composition is impaired.

The OH value of the polyester resin (A) preferably ranges from 20 to 60 KOHmg/g. If the OH value of the polyester resin (A) is less than 20 KOHmg/g, the amount of the diisocyanate to be reacted becomes small and correspondingly the content of the urethane component is lowered. This leads to the lowering of the resistance to ADF contamination of the resulting toner composition, while if it exceeds 60 KOHmg/g, a reaction product having a high molecular weight cannot be obtained and the resistance to offset of the toner composition obtained is reduced.

Moreover, the glass transition point of the polyester resin (A) preferably ranges from 0 to 50° C. This is because if the glass transition point of the polyester resin (A) is less than 0° C., the antiblocking properties of the resulting toner is impaired, while if it exceeds 50° C., the fixing ability of the toner is damaged. In particular, if a part or whole of the diol is replaced with at least one ether bond-containing diol selected from the group consisting of, for instance, diethylene glycol, triethylene glycol and dipropylene glycol for the purpose of controlling the Tg value, the resistance to ADF contamination of the resulting toner is further improved.

The term "polyester resin (B)" as used herein means those obtained by polycondensing at least one dicarboxylic acid with at least one diol. As such dicarboxylic acids and diols, there may be used, for instance, those listed above in connection with the polyester resin (A). The glass transition point (Tg) of the polyester resin (B) preferably ranges from 50° to 90° C. This is because if the glass transition point thereof is less than 50° C., the antiblocking properties of the resulting toner composition is impaired, while if it exceeds 90° C., the fixing ability of the toner composition is impaired. In particular, it is preferred to exceptionally use bisphenol A · ethylene oxide adduct or bisphenol A · propylene oxide adduct for the purpose of elevating the Tg value of the polyester resin (B).

The number average molecular weight of the polyester resin (B) used in the present invention preferably ranges from 1,000 to 5,000. This is because if the number average molecular weight thereof is less than 1,000, Tg of the polyester resin is too low to prevent blocking of the resulting toner particles. On the other hand, if it exceeds 5,000, the viscosity of the polyester resin and hence the resulting toner composition becomes too high to ensure good fixing ability of the toner.

The OH value of the polyester resin (B) used in the invention must be 5 KOHmg/g or lower. If it exceeds 5 KOHmg/g, the number of sites capable of reacting with a diisocyanate increases and correspondingly the molecular weight of the resulting reaction product excessively increases and thus the fixing ability of the toner is deteriorated.

The mixing ratio (weight ratio) of the polyester resin (A) to the polyester resin (B), (A) : (B), ranges from 20:80 to 80:20, in particular 40:60 to 80:20. If the amount of the polyester resin (A) is less than 20% by weight on the basis of the total weight of these polyester resins, the resistance to offset of the resultant toner, while if the amount of the polyester resin (B) is less than 20% by weight on the basis of the total weight of these polyester resins, the fixing ability of the toner is impaired.

As the method for polycondensation, there are in general used any known methods such as high temperature polycondensation and solution polycondensation, and the ratio of the polyhydric alcohol (the diols and the trifunctional alcohols) to the dicarboxylic acid in general ranges from 0.7 to 1.4, which is expressed in terms of the ratio of the number of hydroxyl groups of the former to the number of carboxyl groups of the latter. When the polyester resin (A) is prepared, the polyhydric alcohol is used in excess, while when the polyester resin (B) is prepared, the dicarboxylic acid or a lower alkyl ester thereof is used in excess.

Examples of the diisocyanates used in the present invention include hexamethylene diisocyanate, isophoronhe diisocyanate, tolylene diisocyanate, diphenylmethane diisocyanate, xylylene diisocyanate and tetramethylxylylene diisocyanate.

The amount of the diisocyanate in general ranges from 0.3 to 0.7 mole (0.6 to 1.4 equivalent as expressed in terms of the amount of the NCO groups) and in particular 0.4 to 0.7 mole (0.8 to 1.4 equivalent as expressed in terms of the amount of the NCO groups) per equivalent of the total amount of OH groups of the polyester resins (A) and (B). If the amount of the diisocyanate used is less than 0.3 mole, the resistance to offset of the resultant toner composition is lowered, while if it exceeds 0.7 mole, the amount of OH groups to be reacted with NCO groups of the diisocyanate and a part of the NCO groups thereof remains unreacted. This inversely makes the formation of a reaction product having a high molecular weight very difficult.

The reaction product of a mixture of the polyester resins and the diisocyanate, i.e., the urethane-modified polyester resin can be obtained according to a solvent method or a bulk method and, for instance, can be prepared according to the following method. In other words, a mixture of the polyester resin (A) and the polyester resin (B) is introduced into a twin-screw extruder at a predetermined speed and simultaneously the diisocyanate is also introduced into the extruder at a predetermined speed to perform the reaction at a temperature ranging from 100° to 200° C. while dispersing and mixing the contents of the extruder.

The most general method for preparing the toner composition for electrophotography according to the present invention comprises, for instance, pulverizing the aforementioned urethane-modified polyester resin into powder having a particle size ranging from 0.5 to 5 mm, adding, to the powdery urethane-modified polyester resin, carbon black and optionally an acrylic resin, a styrene resin, an epoxy resin, rosin modified with maleic acid, a petroleum resin, a coloring agent and a small amount of a charge-controlling agent, mixing these ingredients in a Henschel mixer or the like, then kneading and melting the mixture at a temperature ranging from 100° to 150° C. in a kneader or the like, pulverizing the resulting mass and classifying the pulverized mass to obtain particles having a particle size ranging from 5 to 15μ m.

The toner composition for electrophotography thus prepared can always provide stable images having good quality in a high speed copying operation performed at a low quantity of heat without requiring any particular maintenance. The toner composition according to the present invention is very excellent as the toner for high speed copying and has good resistance to ADF contamination.

The toner composition for electrophotography according to the present invention will hereunder be explained in more detail with reference to the following non-limitative working Examples and Preparation Examples and the effects practically accomplished by the present invention will also be discussed in detail in comparison with Comparative Examples given below.

PREPARATION EXAMPLES I TO IX AND i TO iv

In these Preparation Examples, polyester resins (A) and polyester resins (B) were prepared. To a 5l volume flask equipped with a reflux condenser, a device for separating water, a tube for introducing nitrogen gas, a thermometer and a stirring machine, there were introduced a dicarboxylic acid and a trifunctional alcohol whose kinds and relative amounts are listed in the following Tables 1 and 2 respectively and the dicarboxylic acid and the trifunctional alcohol were subjected to dehydration-condensation at 200° to 250° C. while introducing nitrogen gas into the flask.

At the time when the acid value and the OH value of the reaction product reached predetermined values respectively, the reaction product was withdrawn from the flask, cooled and pulverized to thus give polyester resins (A) I to IX and polyester resins (B) i to iv each having properties listed in the following Table 1 or 2 respectively.

PREPARATION EXAMPLES 1 TO 17

In these Preparation Examples, a variety of urethane-modified polyester resins were prepared.

The polyester resin (A) and the polyester resin (B) prepared in the Preparation Examples I to IX and i to iv were mixed together in a mixing ratio (part by weight) listed in the following Table 3. The resulting mixture was fed to a twin-screw kneader (available from KURIMOTO LTD. under the trade name of KEX-40) at a rate of 6 kg/hr and simultaneously a diisocyanate was fed to the kneader at a flow rate listed in the following Table 3 to perform kneading, extrudion and reaction. The resulting product was cooled to thus give each urethane-modified polyester resin 1 to 17 having properties summarized in the following Table 3.

EXAMPLE 1

Each urethane-modified polyester resin 1 to 17 obtained in the corresponding Preparation Example 1 to 17 was granulated by a granulating machine to particles having a particle size ranging from 0.5 to 2 mm, 93 parts by weight of the course particles of the resin were mixed with 5 parts by weight of carbon black (available from MITSUBISHI CHEMICAL INDUSTRIES, LTD. under the trade name of MA 100) and 2 parts by weight of Spiron Black TRH (available from HODOGAYA CHEMICAL CO., LTD.) serving as a charge-controlling agent, the resulting mixture was dispersed and mixed with Henschel mixer and kneaded in a twin-screw kneader to thus give a massive toner composition.

The composition was granulated, then finely pulverized with a pulverizer (I-Type Mill available from NIPPON PNEUMATIC CO., LTD.) and classified to give toner particles having an average particle size of about 8μ m (containing about 3% by weight of particles having a diameter of not more than 5μ m and about 2% by weight of particles having a diameter of not less than 15μ m).

2 Parts by weight of the toner particles were mixed with 98 parts by weight of a ferrite carrier (F 150; available from NIPPON IRON POWDER CO., LTD.) to give a developer.

A commercially available copying machine (EP-870Z; available from MINOLTA CAMERA CO., LTD.) was modified so that the lower limit of the fixing temperature and the offset-generating temperature could be determined and copying tests were carried out while changing the fixing temperature at intervals of 10° C. The results thus observed are summarized in the following Table 3.

In Table 3, the antiblocking properties and the resistance to ADF contamination of the foregoing toner particles as well as the pulverization properties observed when the granulated product (having an average particle size of about 1 mm) of the toner composition after kneading was pulverized are also listed.

Notes included in Tables 1 to 3 are as follows:

1) Polyol KB 300 (bisphenol A propylene oxide adduct available from MITSUI TOATSU CHEMICALS, INC.);

2) Number-average molecular weight (the molecular weight reduced on the basis of that for the standard polystyrene; determined by gel permeation chromatography (GPC));

3) Weight-average molecular weight (the molecular weight reduced on the basis of that for the standard polystyrene; determined by GPC);

4) glass transition point (as determined by the DSC method);

5) tolylene diisocyanate;

6) the MI value was determined at 150° C. and a load of 2160 g (unit: g/10 min.);

7) The gel content was determined by collecting 5 g of a toner and 100 ml of ethyl acetate, mixing them for one hour, then allowing to stand for a whole day and night, gently collecting the supernatant with a spuit and determining the amount of the dissolved polymer as an insoluble matter;

8) The pulverization properties were determined by pulverizing samples with a jet pulverizer (I-Type Mill) available from NIPPON PNEUMATIC CO., LTD., determining the particle size distribution of the resulting fine particles with a Coulter counter and evaluating the pulverization properties thereof in terms of 50% particle diameter according to the following evaluation standard:

○: the 50% particle size is not less than 6.5$\mu$ and less than 8.5$\mu$.

Δ: the 50% particle size is not less than 8.5$\mu$ and less than 10$\mu$.

×: the 50% particle size is not less than 10$\mu$.

9) The antiblocking properties was determined by visually observing the extent of aggregation of powder after allowing to stand at 50° C. for one week and evaluated according to the following evaluation standard:

○: there is not observed any blocking.

Δ: there is observed a partial blocking.

×: there is observed severe blocking.

10) The resistance to ADF contamination was determined by performing double-copying operation of an original, one side of which was solid black and the opposite side of which was white, using a commercially available copying machine (EP-870Z; available from MINOLTA CAMERA CO., LTD.) to obtain 50 copies and evaluating the appearance of the white face of the copies according to the following three-stage evaluation standard:

○: there is not observed any background contamination.

Δ: there is observed a slight background contamination.

×: there is observed severe background contamination.

TABLE 1

| Polyester Resin A No. | I | II | III | IV | V | VI | VII | VIII | IX |
|---|---|---|---|---|---|---|---|---|---|
| (i) Composition (mole part) | | | | | | | | | |
| KB-300[1] | 20 | 25 | 25 | 20 | 30 | 15 | 5 | 20 | 20 |
| diethylene glycol | 26 | 23 | 21 | — | — | 30 | — | 30 | 27 |
| dipropylene glycol | — | — | — | 26 | — | — | 41 | — | — |
| neopentyl glycol | — | — | — | — | 16 | — | — | — | — |
| trimethylol propane | 4 | 2 | 4 | 4 | 4 | 5 | 4 | — | 3 |
| isophthalic acid | 40 | 44 | — | 46 | 43 | 45 | 43 | 43 | 36 |
| phthalic acid anhydride | — | — | 45 | — | — | — | — | — | — |
| (ii) Properties of Resin A | | | | | | | | | |
| OH Value (KOH mg/g) | 49 | 31 | 36 | 25 | 37 | 20 | 52 | 43 | 60 |
| Tg (°C.)[4] | 22 | 41 | 32 | 23 | 55 | 31 | −4 | 24 | 5 |
| Mn[2] | 2300 | 3800 | 3300 | 4700 | 3000 | 5300 | 2200 | 2600 | 1500 |
| Mw[3] | 6800 | 12000 | 11700 | 22800 | 10800 | 26800 | 6500 | 7900 | 3800 |

TABLE 2

| No. of Polyester Resin B | i | ii | iii | iv |
|---|---|---|---|---|
| (i) Composition (mole part) | | | | |
| KB-300 | 42 | 40 | 40 | 42 |
| diethylene glycol | — | — | 10 | — |
| isophthalic acid | 48 | 50 | 50 | 52 |
| phthalic acid anhydride | — | — | 2.5 | — |
| (ii) Properties of Resin B | | | | |
| Acid Value (KOH mg/g) | 31 | 52 | 8 | 75 |
| OH Value (KOH mg/g) | <1 | <1 | <1 | 20 |
| Tg (°C.) | 69 | 64 | 63 | 40 |
| Mn | 3500 | 2200 | 13000 | 1270 |
| Mw | 8300 | 5100 | 34000 | 3100 |

TABLE 3

| No. of Urethane-Modified Polyester Resin | | | 1 | 2 | 3 | 4 | 5 | 6 | 7 | 8 |
|---|---|---|---|---|---|---|---|---|---|---|
| Polyester Resin(A) | Resin No. | | I | I | I | I | I | I | I | I |
| | Part | | 50 | 40 | 30 | 20 | 40 | 40 | 40 | 40 |
| Polyester Resin(B) | Resin No. | | i | i | i | i | i | ii | iii | iv |
| | Part | | 50 | 60 | 70 | 80 | 60 | 60 | 60 | 60 |
| Flow Rate of TDI[5] (g/hr) | | | 171 | 168 | 125 | 84 | 130 | 168 | 168 | 168 |
| Properties of Urethane-Modified Product | Tg (°C.) | | 64 | 66 | 67 | 68 | 64 | 63 | 65 | 48 |
| | MI Value[6] | | 2.2 | 5.1 | 13 | 23 | 42 | 3.2 | 1.9 | 18 |
| | Gel Content[7] | | 4.4 | 9.6 | 11.2 | 6.2 | <1 | 11.5 | 8.6 | 8.8 |
| Properties of Toner | Pulverization Properties[8] | | ○ | ○ | ○ | ○ | ○ | ○ | Δ | Δ |
| | Antiblocking Properties[9] | | ○ | ○ | ○ | ○ | ○ | ○ | ○ | × |
| | Lower Limit of Fixing Temp. | | 120 | 135 | 140 | 130 | 120 | 130 | 175 | 115 |
| | Offset-Generating Temp. | | 240 | 240 | 240 | 200 | 200 | 240 | 230 | 210 |
| | Resistance to ADF Contamination[10] | | ○ | ○ | ○ | Δ | Δ | ○ | ○ | ○ |

TABLE 3-continued

| Within the Scope of This Invention | | Yes | Yes | Yes | Yes | Yes | Yes | No | No |
|---|---|---|---|---|---|---|---|---|---|
| No. of Urethane-Modified Polyester Resin | | 9 | 10 | 11 | 12 | 13 | 14 | 15 | 16 | 17 |
| Polyester Resin(A) | Resin No. | II | III | IV | V | VI | VII | VIII | I | IX |
| | Part | 40 | 40 | 40 | 40 | 40 | 40 | 40 | 70 | 40 |
| Polyester Resin(B) | Resin No. | i | i | i | i | i | i | i | i | i |
| | Part | 60 | 60 | 60 | 60 | 60 | 60 | 60 | 30 | 60 |
| Flow Rate of TDI[5] (g/hr) | | 138 | 120 | 97 | 124 | 61 | 174 | 144 | 168 | 185 |
| Properties of Urethane-Modified Product | Tg (°C.) | 72 | 70 | 66 | 69 | 65 | 46 | 64 | 62 | 58 |
| | MI Value[6] | 2.6 | 3.5 | 3.8 | 0.8 | 1.7 | 12.5 | 26 | 0.9 | 6.2 |
| | Gel Content[7] | 12.5 | 7.6 | 12.6 | 12.8 | 6.8 | 14.7 | <1 | 1.3 | 10 |
| Properties of Toner | Pulverization Properties[8] | ◯ | ◯ | ◯ | ◯ | ◯ | ◯ | ◯ | ◯ | ◯ |
| | Antiblocking Properties[9] | ◯ | ◯ | ◯ | ◯ | ◯ | X | ◯ | ◯ | ◯ |
| | Lower Limit of Fixing Temp. | 140 | 130 | 130 | 180 | 130 | 120 | 140 | 120 | 120 |
| | Offset-Generating Temp. | 240 | 240 | 240 | 240 | 240 | 220 | 180 | 240 | 240 |
| | Resistance to ADF Contamination[10] | ◯ | ◯ | △ | △ | X | △ | △ | ◯ | ◯ |
| Within the Scope of This Invention | | Yes | Yes | Yes | No | No | No | No | Yes | Yes |

As is clear from the results listed in Table 3, the toner composition of the present invention has hot-melt properties suitable for rapid copying, for instance, the lower limit of fixing temperature thereof is low and the temperature range within which the toner can be fixed is very wide. Moreover, the toner composition is excellent in resistance to offset, antiblocking properties, resistance to ADF contamination, pulverization properties and quality of images. Thus, the toner composition of the present invention shows practically excellent quality as a toner composition for electrophotography.

We claim:

1. A toner composition for electrophotography comprising, as a principal component, a reaction product of (i) a diisocyanate with (ii) a mixture which comprises:
   (a) 20 to 80% by weight of a polyester resin (A) whose number average molecular weight ranges from 1,000 to 5,000, whose glass transition point ranges from 0° to 41° C., whose OH value ranges from 20 to 60 KOHmg/g and which is prepared by polycondensing at least one dicarboxylic acid, at least one diol, and at least on trifunctional alcohol in an amount of from 2 to 10 mole % on the basis of the total amount of starting raw alcohols consisting of at least one diol and at least one trifunctional alcohol; and
   (b) 80 to 20% by weight of a polyester resin (B) whose number average molecular weight ranges from 1,000 to 5,000, whose glass transition point ranges from 50 to 90° C. and whose OH value is not more than 5 KOHmg/g.

2. The toner composition of claim 1 which comprises, as a principal component, a reaction product of a diisocyanate with a mixture which comprises 40 to 80% by weight of the polyester resin (A) and 60 to 20% by weight of the polyester resin (B).

3. The toner composition of claim 1 wherein the polyester resin (A) is a product obtained by polycondensing at least one dicarboxylic acid selected from the group consisting of malonic acid, succinic acid, glutaric acid, adipic acid, azelaic acid, sebacic acid, hexahydrophthalic anhydride, maleic acid, maleic anhydride, fumaric acid, itaconc acid, citraconic acid, phthalic anhydride, phthalic acid, terephthalic acid, isophthalic acid and lower alkyl esters thereof, at least one diol selected from the group consisting of ethylene glycol, 1,2-ptopylene glycol, 1,3-propylene glycol, 1,3-butylene glycol, 1,4-butylene glycol, 1,6-hexanediol, neopentyl glycol, diethylene glycol, triethylene glycol, dipropylene glycol, hydrogenated bisphenol A, bisphenol A-ethylene oxide adduct and bisphenol A-propylene oxide adduct, and at least one trifunctional alcohol selected from the group consisting of glycerin, trimethylol propane and trimethylol ethane.

4. The toner composition of claim 3 wherein the diol comprises at least one ether bond-containing diol selected from the group consisting of diethylene glycol, triethylene glycol and dipropylene glycol.

5. The toner composition of claim 1 wherein the polyester resin (B) is a product obtained by polycondensing at least one dicarboxylic acid selected from the group consisting of malonic acid, succinic acid, glutaric acid, adipic acid, azelaic acid, sebacic acid, hexahydrophthalic anhydride, maleic acid, maleic anhydride, fumaric acid, itaconc acid, citraconic acid, phthalic anhydride, phthalic acid, terephthalic acid, isOphthalic acid and lower alkyl esters thereof and at least one diol selected from the group consisting of ethylene glycol, 1,2-ptopylene glycol, 1,3-propylene glycol, 1,3 butylene glycol, 1,4-butylene glycol, 1,6-hexanediol, neopentyl glycol, diethylene glycol, triethylene glycol, dipropylene glycol, hydrogenated bisphenol A, bisphenol A-ethylene oxide adduct and bisphenol A-propylene oxide adduct.

6. The toner composition of claim 1 wherein the diisocyanate is at least one member selected from the group consisting of hexamethylene diisocyanate, isophoronhe diisocyanate, tolylene diisocyanate, diphenylmethane diisocyanate, xylylene diisocyanate and tetramethylxylylene diisocyanate.

* * * * *

UNITED STATES PATENT AND TRADEMARK OFFICE
CERTIFICATE OF CORRECTION

PATENT NO. : 5,202,212

DATED : April 13, 1993

INVENTOR(S) : Shin et al.

It is certified that error appears in the above-identified patent and that said Letters Patent is hereby corrected as shown below:

Column 9, line 40, delete "on" and insert therefor --one--.

Column 10, line 21, delete "itaconc" and insert therefor --itaconic--.

Column 10, line 24, delete "1,2-ptopy-" and insert therefor -- 1,2-propy- --.

Column 10, line 43, delete "itaconc" and insert therefor --itaconic--.

Column 10, line 44, delete "isOphthalic" and insert therefor --isophthalic--.

Col. 10, line 47, delete "1,2-ptopylene" should read --1,2-propylene--

Column 10, line 56, delete "isophoronhe" and insert therefor --isophorone--.

Signed and Sealed this

Twelfth Day of April, 1994

*Attest:*

BRUCE LEHMAN

*Attesting Officer*

Commissioner of Patents and Trademarks